United States Patent
Chen et al.

(10) Patent No.: US 11,915,109 B2
(45) Date of Patent: Feb. 27, 2024

(54) SYSTEMS AND METHOD FOR AUTOMATING DETECTION OF REGIONS OF MACHINE LEARNING SYSTEM UNDERPERFORMANCE

(71) Applicant: Arthur AI, Inc., New York, NY (US)

(72) Inventors: Kenneth S. Chen, Dover, MA (US); Reese Hyde, Brooklyn, NY (US); Keegan E. Hines, Richmond, VA (US)

(73) Assignee: Arthur AI, Inc., New York, NY (US)

( * ) Notice: Subject to any disclaimer, the term of this patent is extended or adjusted under 35 U.S.C. 154(b) by 0 days.

(21) Appl. No.: 17/945,335

(22) Filed: Sep. 15, 2022

(65) Prior Publication Data
US 2023/0098255 A1    Mar. 30, 2023

Related U.S. Application Data

(60) Provisional application No. 63/246,082, filed on Sep. 20, 2021.

(51) Int. Cl.
*G06N 20/00*    (2019.01)
(52) U.S. Cl.
CPC ................................. *G06N 20/00* (2019.01)
(58) Field of Classification Search
CPC .................................................... G06N 20/00
See application file for complete search history.

(56) References Cited

U.S. PATENT DOCUMENTS

| | | | |
|---|---|---|---|
| 2011/0307423 A1* | 12/2011 | Shotton | G06N 20/00 706/12 |
| 2013/0117280 A1* | 5/2013 | Donaldson | G06F 16/17 707/754 |
| 2014/0122381 A1* | 5/2014 | Nowozin | G06N 20/00 706/12 |
| 2015/0019569 A1* | 1/2015 | Parker | G06F 16/3344 707/748 |
| 2018/0005126 A1* | 1/2018 | Yamagami | G06Q 30/02 |
| 2018/0336487 A1* | 11/2018 | Moore | G06N 5/003 |
| 2020/0302318 A1* | 9/2020 | Hetherington | G06N 5/025 |
| 2022/0392055 A1* | 12/2022 | Do | G06T 7/269 |

OTHER PUBLICATIONS

Rokach, "Decision Trees", Data Mining and Knowledge Discovery Handbook, 2005. (Year: 2005).*

(Continued)

*Primary Examiner* — Dave Misir
(74) *Attorney, Agent, or Firm* — COOLEY LLP (57) ABSTRACT

In some embodiments, a method includes generating a trained decision tree with a set of nodes based on input data and a partitioning objective, and generating a modified decision tree by recursively passing the input data through the trained decision tree, recursively calculating, for each of the nodes, an associated set of metrics, and recursively defining an association between each of the nodes and the associated set of metrics. A node from a set of nodes of the modified decision tree is identified that violates a user-specified threshold value, associated with a user, for at least one of the metrics. The method also includes causing transmission of a signal to a compute device of the user, the signal including a representation of the identified node.

23 Claims, 7 Drawing Sheets

(56) References Cited

OTHER PUBLICATIONS

Kotsiantis, "Decision trees: a recent overview", Artificial Intelligence Rev., 2013. (Year: 2013).*

Rokach, "Decision Trees", Data Mining and Knowledge Discovery Handbook, 2005. (Previously Supplied). (Year: 2005).*

Kotsiantis, "Decision trees: a recent overview", Artificial Intelligence Rev., 2013. (Previously Supplied). (Year: 2013).*

Criminisi, "Decision Forests: A Unified Framework for Classification, Regression, Density Estimation, Manifold Learning and Semi-Supervised Learning", Foundations and Trends in Computer Graphics and Vision, vol. 7, Nos. 2-3, 2011, pp. 81-227 (Year: 2011).*

Mian, "What's Most Broken? Design and Evaluation of a Tool to Guide Improvement of an Intelligent Tutor", AIED 2019, LNAI 11625, pp. 283-295, 2019. In applicants' IDS. (Year: 2019).*

Devlin, J. et al., "BERT: Pre-training of Deep Bidirectional Transformers for Language Understanding," [Online], Retrieved from the Internet: arXiv:1810.04805v2 [cs.CL], May 2019, 16 pages.

He, K. et al., "Deep Residual Learning for Image Recognition," [Online], Retrieved from the Internet: arXiv:1512.03385v1 [cs.CV], Dec. 2015, 12 pages.

Liu, Y. et al., "RoBERTa: A Robustly Optimized BERT Pretraining Approach," [Online], Retrieved from the Internet: arXiv:1907.11692v1 [cs.CL], Jul. 2019, 13 pages.

Simonyan, K. et al., "Very Deep Convolutional Networks for Large-Scale Image Recognition," ICLR 2015, [Online], Retrieved from the Internet: arXiv:1409.1556v6 [cs.CV], Apr. 2015, 14 pages.

Vaswani, A. et al., "Attention Is All You Need," [Online], Retrieved from the Internet: arXiv:1706.03762v5 [cs.CL], Dec. 2017, 15 pages.

International Search Report and Written Opinion for International Application No. PCT/US2022/076475 dated Dec. 12, 2022, 14 pages.

Mian, S. et al., "What's Most Broken? Design and Evaluation of a Tool to Guide Improvement of an Intelligent Tutor," Jun. 2019, Advances in Databases and Information Systems, Lecture Notes in Computer Science, Springer Nature Switzerland AG 2019, Isotani, S. et al. (Eds.): AIED 2019, LNAI 11625, pp. 283-295.

* cited by examiner

SYSTEMS AND METHOD FOR AUTOMATING DETECTION OF REGIONS OF MACHINE LEARNING SYSTEM UNDERPERFORMANCE

CROSS REFERENCE TO RELATED APPLICATIONS

This application claims priority to and the benefit of U.S. Provisional Patent Application No. 63/246,082, filed Sep. 20, 2021 and titled "SYSTEMS AND METHOD FOR AUTOMATING DETECTION OF REGIONS OF MACHINE LEARNING SYSTEM UNDERPERFORMANCE," the contents of which are incorporated by reference herein in their entirety.

TECHNICAL FIELD

The present disclosure relates generally to computer networks and, more specifically, to the assessment of machine learning system performance.

BACKGROUND

Machine learning (ML) refers to models or algorithms that can receive input data and use statistical analysis to predict an output. ML can also include updating outputs as new input data becomes available. The performance of a ML model can be assessed using evaluation metrics such as classification accuracy.

SUMMARY

In some embodiments, a processor-implemented method includes generating a trained decision tree based on input data and a partitioning objective. The trained decision tree includes a plurality of nodes, each node from the plurality of nodes having at least a subset of the input data from a plurality of subsets of the input data. The method also includes generating a modified decision tree (also referred to herein as a "hotspot" tree) by recursively passing the input data through the trained decision tree, and recursively calculating, for each node from the plurality of nodes, an associated set of metrics from a plurality of metrics. An association between each node from the plurality of nodes and the associated set of metrics from the plurality of metrics is recursively defined, thereby generating the modified decision tree. The method also includes identifying a node from the plurality of nodes of the modified decision tree that violates a user-specified threshold value for at least one metric from the plurality of metrics, the user-specified threshold value associated with a user, and causing transmission of a signal including a representation of the identified node from the plurality of nodes of the modified decision tree to a compute device of the user.

In some embodiments, a processor-implemented method includes generating a modified decision tree by recursively passing input data through a trained decision tree, and recursively calculating, for each node from a plurality of nodes of the trained decision tree, an associated set of metrics from a plurality of metrics. An association is recursively defined between each node from the plurality of nodes and the associated set of metrics from the plurality of metrics, thereby generating the modified decision tree. The method also includes identifying a node from the plurality of nodes of the modified decision tree that violates a user-specified threshold value for at least one metric from the plurality of metrics, the user-specified threshold value associated with a user, and causing transmission of a signal including a representation of the identified node from the plurality of nodes of the modified decision tree to a compute device of the user.

In some embodiments, a processor-implemented method includes training a decision tree based on input data and a partitioning objective, to produce a trained decision tree that includes a plurality of nodes. Each node from the plurality of nodes includes at least a subset of the input data from a plurality of subsets of the input data. A modified decision tree is generated by recursively passing the input data through the trained decision tree, and recursively calculating, for each node from the plurality of nodes, an associated set of metrics from a plurality of metrics. An association is recursively defined between each node from the plurality of nodes and the associated set of metrics from the plurality of metrics, thereby generating the modified decision tree. The method also includes identifying a node from the plurality of nodes of the modified decision tree that violates a user-specified threshold value for at least one metric from the plurality of metrics. The user-specified threshold value is associated with a user. The method also includes causing transmission of a signal including a representation of the identified node from the plurality of nodes of the modified decision tree to a compute device of the user.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

Evaluation metrics exist for assessing the performance of machine learning (ML) models/algorithms. Such metrics include, for example, classification accuracy, logarithmic loss, confusion matrices, area under the curve (AUC), F1 score, mean absolute error, and mean squared error. Such known methods for assessing ML model performance, however, often fail to identify particular portions of the ML model that are underperforming other portions of the ML model. As such, modifications to ML models that are based on known assessment methods are inefficient and cannot be relied on to fully optimize performance. Embodiments of the present disclosure address the foregoing issue by facilitating the efficient identification of data regions within a ML system that tend to perform poorly compared to a global average level of performance. Such data regions having relatively poor performance are referred to herein as "hotspots." Users can partition data regions based on selected metrics that are embedded within the nodes of decision trees, and information can be populated for every single ground truth class.

When a ML system has high dimensional data, finding the right data input regions for troubleshooting becomes a difficult problem. Systems and methods set forth herein can automate the identification of data regions associated with poor ML performance, thereby significantly reducing the time spent and the errors associated with identifying such data regions. Inputs compatible with systems and methods of the present disclosure can include, for example, tabular data, computer vision (CV) data, and/or natural language processing (NLP) data. With regard to outputs, systems and methods of the present disclosure can perform, or can be compatible with, for example, regression tasks and/or a variety of different classification tasks.

Figure 1:
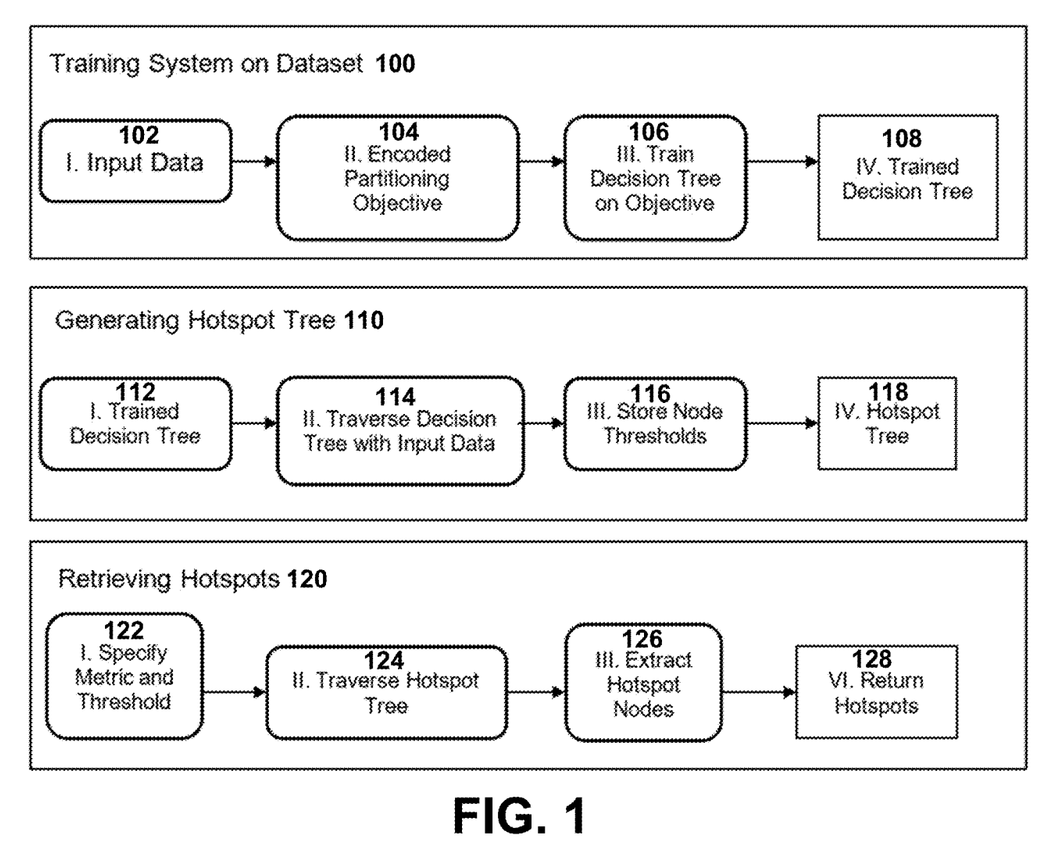
FIG. 1 includes flow diagrams for methods of training a system on a dataset, generating hotspot trees, and retrieving hotspots, according to some embodiments.

FIG. 1 includes flow diagrams for methods of training a ML system on a dataset, generating hotspot trees, and querying to retrieve hotspots from the hotspot trees, according to some embodiments. As shown in FIG. 1, a method 100 of training a machine learning system on a dataset includes receiving input data at 102, receiving an encoded partitioning objective at 104, and training a decision tree at 106 based on the partitioning objective, to produce a trained decision tree 108. A method 110 of generating a hotspot tree includes receiving a trained decision tree at 112 (e.g., the trained decision tree 108 of method 100), traversing a decision tree at 114 based on an input data (e.g., similar to input data 102 in method 100), and storing node thresholds at 116, to produce a hotspot tree 118. A method of retrieving hotspots 120 includes receiving, at 122, a specified metric and threshold (e.g., in the form of a query), traversing a hotspot tree (e.g., the hotspot tree 118 of method 110) at 124, extracting hotspot nodes from the hotspot tree at 126, and returning the extracted hotspots at 128 (e.g., to a requester, for example by displaying the extracted hotpots via a graphical user interface (GUI)).

As shown by methods 100 and 110 of FIG. 1, collectively, in some embodiments, a method for detecting regions of underperformance of a machine learning system includes at least three steps: training a decision tree based on input data (e.g., a batch dataset) and generating classification outputs, generating/defining one or more custom encoded partitioning objectives based on the classification outputs, generating a hotspot tree, and receiving user-specified thresholds for generating hotspots based on the hotspot tree. Hotspots can be identified, or "surfaced," for each batch of data in an ML model.

In some such implementations, for streaming data or time series data, the input data has a batch structure that is produced over a predefined time period, for example 7 days. In some implementations, for a given set of classification outputs, the encoded partitioning objective is generated by labeling datapoints (i.e., predictions) with incorrect classification predictions as "1," and labeling datapoints as "0" otherwise. In other implementations, for a given set of classification output, the encoded partitioning objective is generated by labeling datapoints (i.e., predictions) with one of four different labels: true positive (TP), false positive (FP), true negative (TN), or false negative (FN). In other words, the partitioning objective can specify correct and incorrect classifications, and can apply to binary classifications as well as multiclass classifications. For regression outputs, the encoded partitioning objective can be created by identifying datapoints having the highest prediction error, e.g., as measured by root-mean-square deviation (RMSE), mean absolute error (MAE), etc., and encoding those datapoints as "1" (while labeling all other datapoints as "0"). The "1" labels can be assigned, for example, to all datapoints exceeding a minimum threshold amount of prediction error. Label assignments can be determined in any of a variety of ways, such as based on the range: median+/−mean absolute deviation (MAD), based on the range: mean+/−MAD, or based on percentile rules.

In some implementations, the input data for 102 training the decision tree at 106 includes metadata associated with each datapoint, regardless of whether the datapoints were used in producing the predictions. This inclusion of metadata provides additional flexibility for adding features to partition the data. The resulting trained decision tree (or decision model) at 108 can, in turn, be configured to search for the best splits on the input features to isolate the "1" classification values, i.e., to isolate the nodes with relatively poor predictions, based on information criterion (e.g., the Gini impurity). The trained decision tree 108 may be deterministic, in that the input data 105 and encoded partitioning objective 104 do not change, an example of which is shown and described below with reference to FIG. 2.

In some implementations, to create thresholds for users to query and to optimize for efficient storage, a "lightweight" hotspot tree can be created via recursion on the trained decision tree 108 (e.g., at 114). The input data 102 can be recursively or iteratively passed through the trained decision tree 108 and filtered at each split in the recursion. Each split can be based on an information criterion. Each split impacts how data is split among child nodes and other subsequent descendant nodes. At each node, an impurity value, a number of samples, split information, a feature rule set along the node path, and confusion matrix metrics (such as precision, recall, F1, accuracy) can be calculated at the macro scale (e.g., per node) and at the micro scale (e.g., per ground truth class per node). Node thresholds (and, optionally, the metadata) can be stored at each node in the hotspot tree (at 116), and after the recursion is complete, the hotspot tree is persisted in a data store at 118. In some implementations, the traversal of the decision tree with the input data at 114 is performed concurrently with storing the node thresholds at 116. In other words, node thresholds can be stored as the decision tree is traversed with the dataset.

In some implementations, a user(s) specifies the one or more metrics and thresholds at 122. For example, a user may specify a threshold, such as a desired upper bound precision threshold. The upper bound precision threshold may have a value of between 0 and 1 (e.g., 0.4). The hotspot tree can be retrieved and traversed at 124 along all possible paths. At any node in the traversal, if a node violates the threshold, that node is defined as a hotspot, and all of the information (e.g., data, metadata) in that node can be appended to a list of hotspots during the extraction of the hotspot nodes at 126.

In some implementations, when a node is identified as a hotspot during a given traversal of the hotspot tree, the traversal along that path stops because "downstream" nodes (i.e., nodes that are closer to a leaf node, or nodes that are further away from a root node, relative to a subject node) would be more "pure" (i.e., more of the associated output labels would be the same/homogeneous—for example all having a value of "1" or all having a value of "0") and the nodes with poor performance are in even more extreme violation of the user-provided metric and threshold. Once all traversal paths are complete, an indication of the identified hotspots is returned to the user at 128. The user can subsequently re-query with different metrics, different thresholds, and/or different metric-threshold combinations, depending on the question being asked and the tolerance level for the threshold. The hotspots include the filters on the input data regions that can be applied in fetching the entire dataset for further examination, research, and model development, as shown and discussed below with reference to FIGS. 3A-3B.

Figure 2:
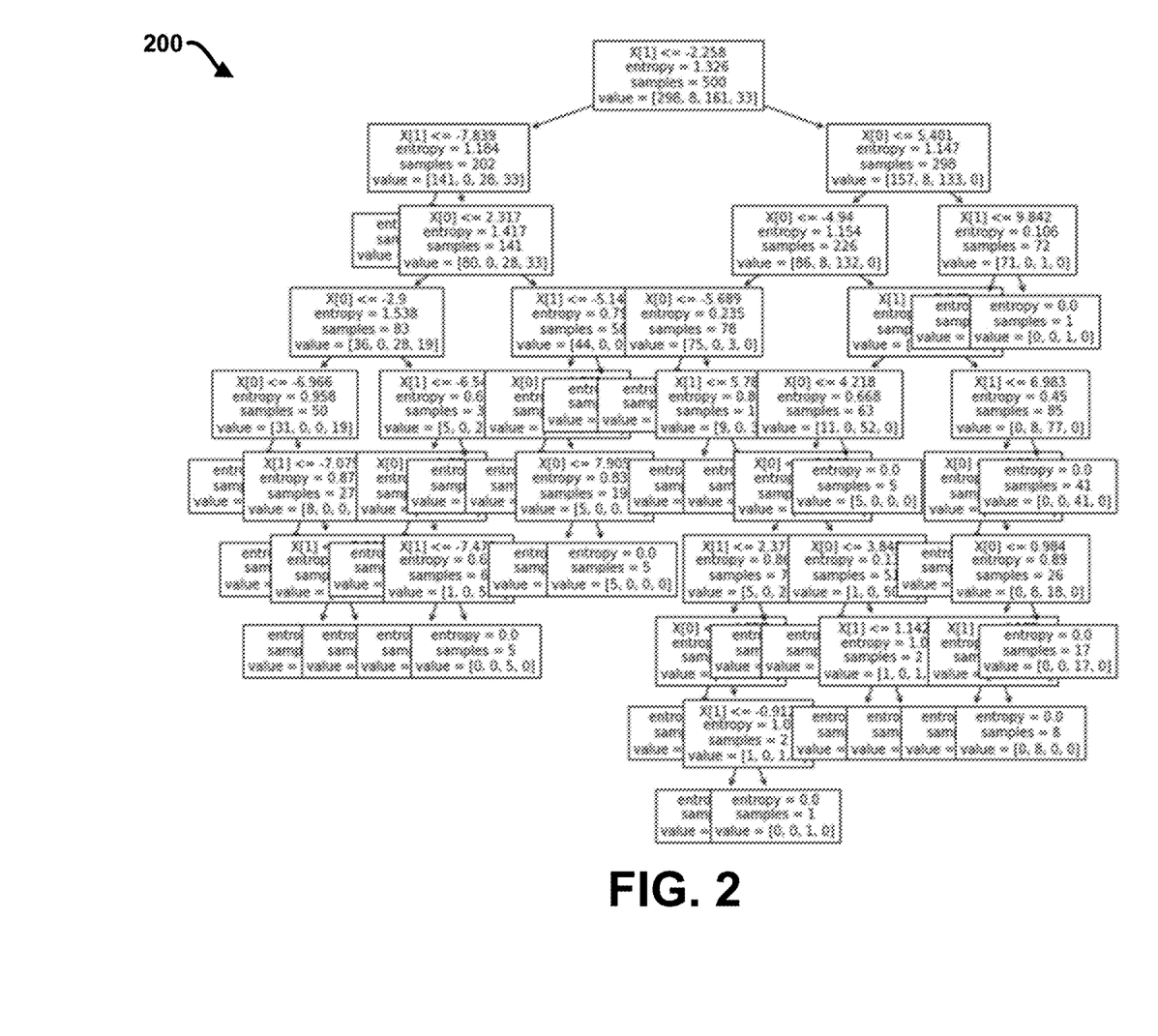
FIG. 2 illustrates an example trained decision tree, according to an embodiment.

FIG. 2 illustrates an example of a trained decision tree (e.g., trained decision tree 108 of method 100), according to an embodiment. As shown in FIG. 2, the trained decision tree has been trained on two inputs: X[0] and X[1]. Each box is a node, and each node has an associated set of metrics (e.g., accuracy, precision, recall, etc.) that can be used as thresholds in querying for hotspots. Each node represents a collection of datapoints, which are filtered by the accumulated ranges on the input features on the path from the top root node to the particular node in question. A hotspot is a node that violates the threshold specified by a user (e.g., at 122 in method 120) and is identified during an extraction step (e.g., at 126 in method 120). Any node in a trained decision tree can be a hotspot (i.e., hotspots are not limited to the terminal "leaf" nodes at the bottom of the tree). In some implementations, the traversal of the hotspot tree at 124 is performed concurrently with extracting the hotspot nodes at 126. In other words, the hotspot nodes can be extracted as the hotspot tree is traversed.

Figure 3A:
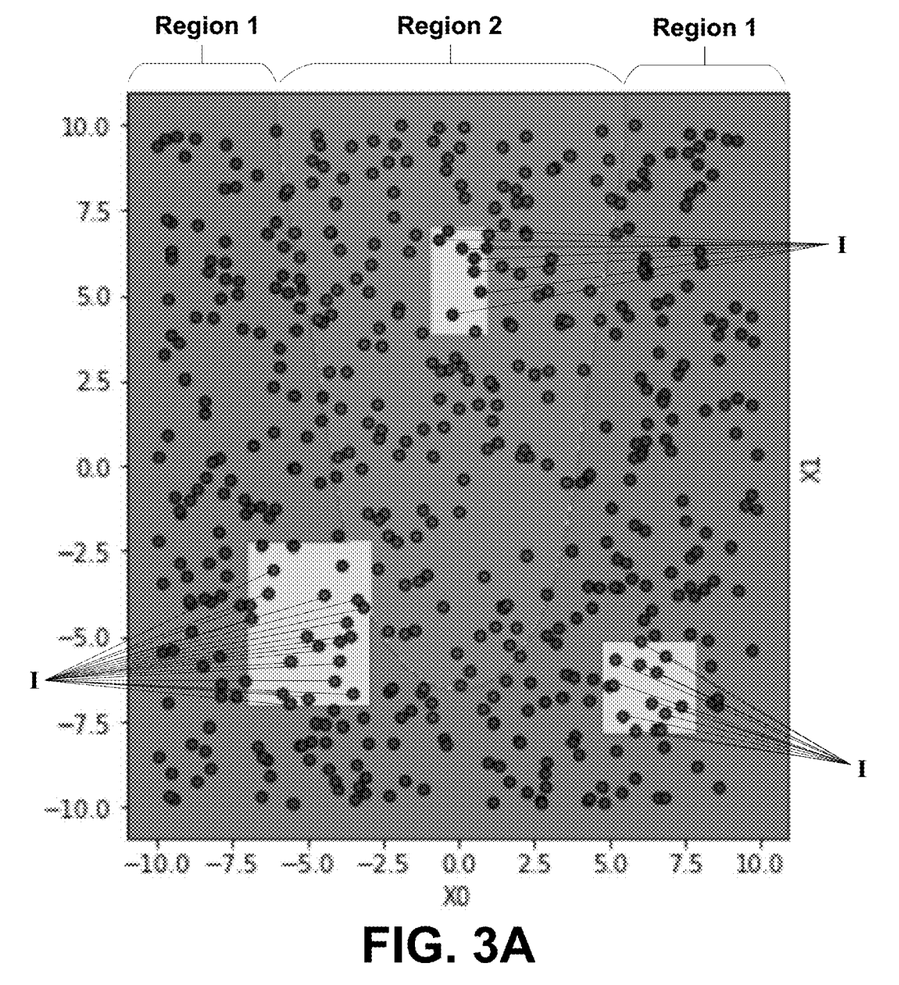
FIGS. 3A-3B are plots showing hotspot retrieval within decision surfaces generated by a support vector classifier (SVC), for accuracy thresholds of 0.3 and 0.5, respectively, according to some embodiments.
Figure 3B:
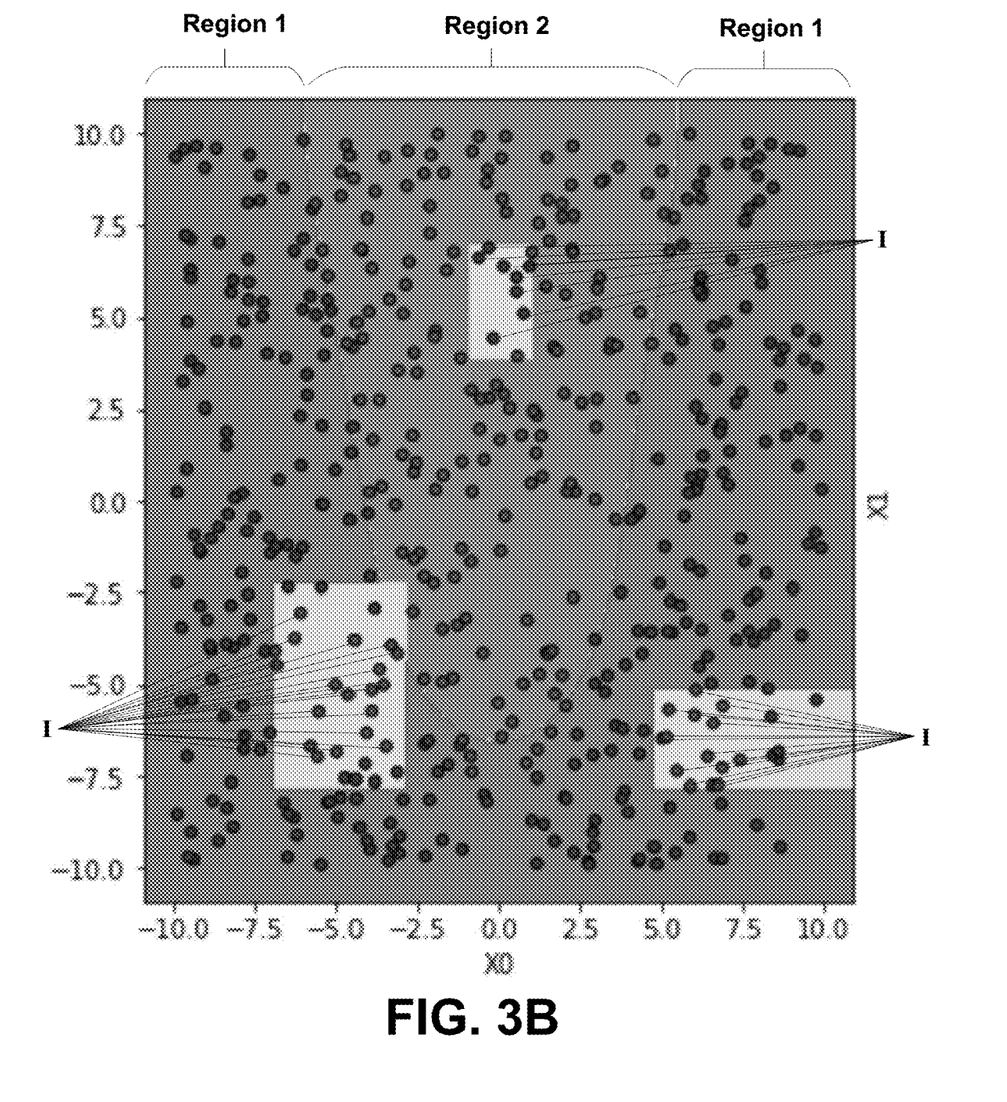

FIGS. 3A-3B are plots showing hotspot retrieval on two inputs, within decision surfaces generated by a support vector classifier (SVC), for accuracy thresholds of 0.3 and 0.5, respectively, according to some embodiments. The rectangular boxes within Regions 1 and 2 are the hotspots, in that some or all of the points within the boxes are incorrectly classified (see the points labelled "I" in each of FIGS. 3A and 3B). As the threshold (accuracy, in this case) decreases, the algorithm targets node candidates with increasingly incorrect classifications, and the hotspot regions are narrower/purer. In other words, as the threshold decreases with deeper traversal into the tree, whereby more bounds (or more stringent bounds on already established bounds) are accumulated on the input features. As such, the size of the input boxes will always become tighter.

Computer Vision and Imagery Data

As an example application, the framework discussed above can be used to process image data for use in computer vision tasks, and the image data can be for grayscale images, single color images, and/or multicolor images. In some such implementations, the input data may not be the original images, but rather the embeddings (i.e., low-dimensional representations) for each image. The low-dimensional representations may be extracted, for example, using transfer learning with a pre-trained convolutional neural network. Example neural networks suitable for this purpose include those discussed in "Deep Residual Learning for Image Recognition" by K. He., et al., 2016 IEEE Conference on Computer Vision and Pattern Recognition (CVPR) (27-30 Jun. 2016), and in "Very Deep Convolutional Networks for Large-Scale Image Recognition" by K. Simonyan, et. al., The $3^{rd}$ International Conference on Learning Representations (ICLR) (2015), the entire content of each of which is incorporated by reference herein for all purposes. Alternatively, a convolutional network could be trained for a given desired task. In such implementations, a low-dimensional representation of the image may be extracted from the penultimate layer of the task-specific convolutional network. All other steps can remain the same as described above in the context of FIG. 1 (e.g., for tabular data), with the exception of a modification to the hotspot filters. With the hotspots containing filters on the embedding space and not the original pixels of images, the system can additionally return the image identifiers (IDs) associated with each hotspot so that the user can extract the original raw images.

Natural Language Processing and Sequence Data

As another example application, the framework discussed above can be used to process text data for use in natural language processing tasks. In some such implementations, input data may not include the original text, but rather the embedding (i.e., low-dimensional representations of the original text), for each document. The low-dimensional representations of the original text may be extracted, for example, using transfer learning with a pre-trained neural network. Example neural networks suitable for this purpose include those discussed in "Attention is All You Need" by A. Vaswani, et al., $31^{st}$ Conference on Neural Information Processing Systems (2017), "BERT: Pre-Training of Deep Bidirectional Transformers for Language Understanding" by J. Devlin, et. al., Proceedings of NAACL-HLT (2019), or "RoBERTa: A Robustly Optimized BERT Pretraining Approach" by Y. Liu, et al., accessed at https://arxiv.org/abs/1907.11692, the entire content of each of which is incorporated by reference herein for all purposes. Alternatively or in addition, a convolutional neural network compatible with natural language processing may be used. Alternatively, a language model trained for a desired task at hand may be used. In such implementations, a low-dimensional representation of the document may be extracted from the penultimate layer of the task-specific network. All other steps can remain the same as described above in the context of FIG. 1 (e.g., for tabular data), with the exception of a modification to the hotspot filters. With the hotspots containing filters on the embedding space and not the original documents, the system would additionally return the document IDs associated with each hotspot so that the user can extract the original raw documents.

Figure 4:
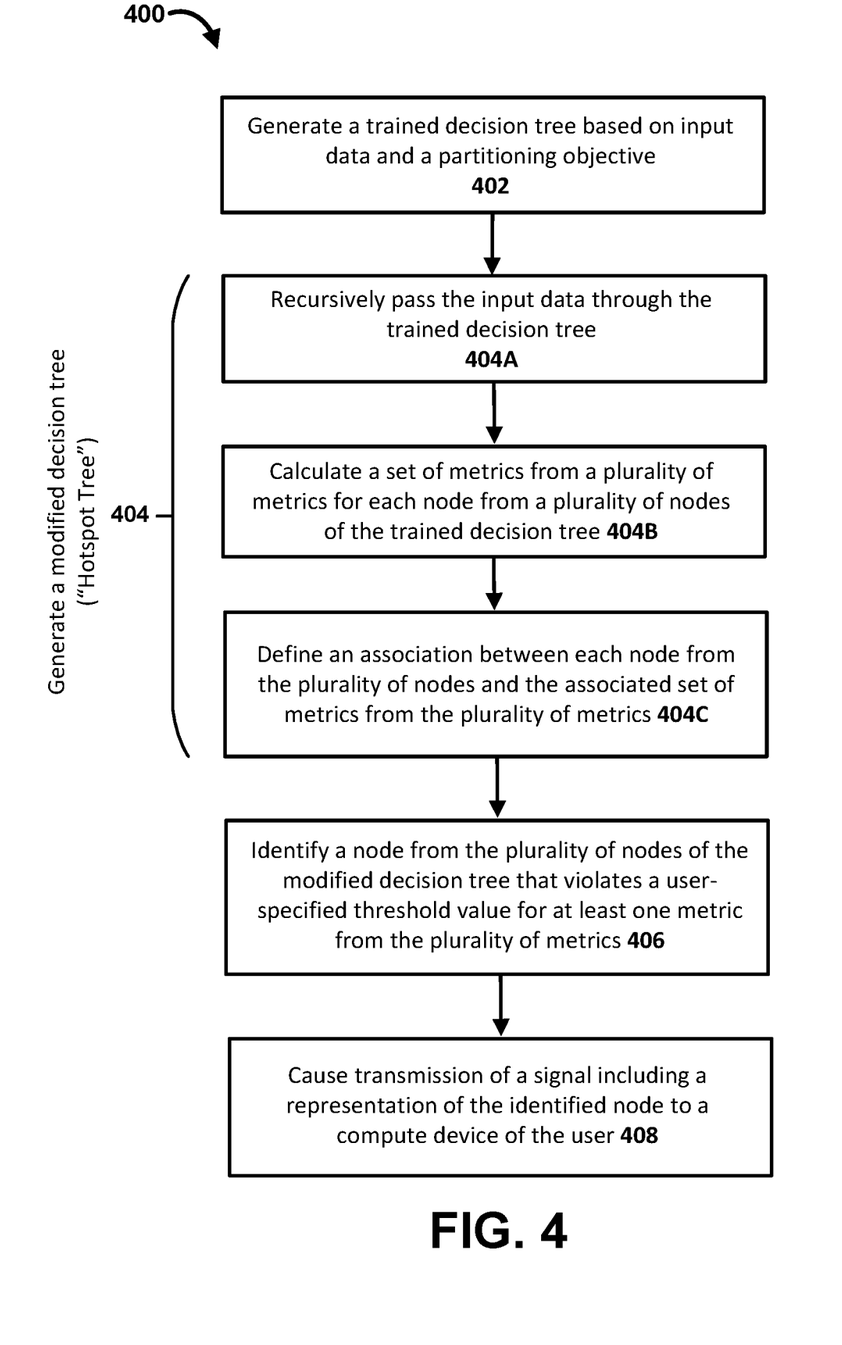
FIG. 4 is a flow diagram showing a first example method for detecting regions of underperformance of a machine learning system, according to an embodiment.

FIG. 4 is a flow diagram showing a first example method for detecting regions of underperformance of a machine learning system, according to an embodiment. As shown in FIG. 4, the processor-implemented method 400 includes generating a trained decision tree at 402 based on input data and a partitioning objective. The trained decision tree can include a plurality of nodes, each node from the plurality of nodes having at least a subset of the input data from a plurality of subsets of the input data. The method 400 also includes generating a modified decision tree (also referred to herein as a "hotspot" tree) at 404 by recursively passing the input data through the trained decision tree at 404A, and recursively calculating, at 404B and for each node from the plurality of nodes, an associated set of metrics from a plurality of metrics. An association between each node from the plurality of nodes and the associated set of metrics from the plurality of metrics is recursively defined at 404C, thereby generating the modified decision tree. The method 400 also includes, at 406, identifying a node from the plurality of nodes of the modified decision tree that violates a user-specified threshold value for at least one metric from the plurality of metrics, the user-specified threshold value associated with a user, and causing transmission at 408 of a signal including a representation of the identified node from the plurality of nodes of the modified decision tree to a compute device of the user. In some implementations, the recursively passing the input data through the trained decision tree at 404A, the recursively calculating of the sets of metrics at 404B, and the recursively defining the associations between each node and the associated set of metrics at 404C are performed in parallel or at least partially overlap each other in time.

In some implementations, the signal further includes a representation of the set of metrics from the plurality of metrics associated with the identified node from the plurality of nodes of the modified decision tree.

In some implementations, the method also includes not further attempting to identify violations of the user-specified threshold value in downstream nodes from the plurality of nodes, in response to identifying the node that violates the user-specified threshold value.

In some implementations, each set of metrics from the plurality of metrics includes a representation of at least one of: an impurity, a number of samples, an entropy, split information, a feature rule set of an associated node path, an accuracy, a precision, a recall, or an F1 score.

In some implementations, the input data is streaming data and the generating the trained decision tree is performed over a predefined time period.

In some implementations, the input data is streaming data associated with a predefined time period.

In some implementations, the input data includes a plurality of classification predictions, and the generating the trained decision tree includes labelling each subset of the input data from the plurality of subsets of the input data based on an accuracy of a subset of classification predictions, from the plurality of classification predictions, associated with that subset of the input data.

In some implementations, the input data includes a plurality of regression outputs, and the generating the trained decision tree includes labelling each subset of the input data from the plurality of subsets of the input data based on a prediction error of a subset of regression outputs, from the plurality of regression outputs, associated with that subset of the input data.

In some implementations, the input data includes metadata and the partitioning objective is defined, at least in part, by the metadata.

In some implementations, the generating the trained decision tree is further based on an information criterion.

In some implementations, the information criterion is a Gini impurity.

In some implementations, the recursively passing the input data through the trained decision tree is performed for each ground truth from a plurality of ground truths.

In some implementations, the recursively passing the input data through the trained decision tree defines a recursion, the generating the modified decision tree further including filtering the input data at each split of a plurality of splits of the recursion.

In some implementations, the input data includes tabular data.

In some implementations, the input data includes low-dimensional representations of images. The low-dimensional representations of the images can be generated using at least one of a convolutional neural network or transfer learning.

In some implementations, the input data includes low-dimensional representations of text for natural language processing.

In some implementations, the low-dimensional representations of the images are generated using at least one of a language model or transfer learning.

In some implementations, each node from the plurality of nodes of the modified decision tree represents a collection of datapoints that are filtered by accumulated ranges of features of the input data along a path from a root node to that node.

In some implementations, the identified node is an intermediate node of the modified decision tree.

In some implementations, the identified node is positioned between a root node of the modified decision tree and a terminal leaf node of the modified decision tree.

In some embodiments, a processor-implemented method includes generating a modified decision tree by recursively passing input data through a trained decision tree, and recursively calculating, for each node from a plurality of nodes of the trained decision tree, an associated set of metrics from a plurality of metrics. An association is recursively defined between each node from the plurality of nodes and the associated set of metrics from the plurality of metrics, thereby generating the modified decision tree. The method also includes identifying a node from the plurality of nodes of the modified decision tree that violates a user-specified threshold value for at least one metric from the plurality of metrics, the user-specified threshold value associated with a user, and causing transmission of a signal including a representation of the identified node from the plurality of nodes of the modified decision tree to a compute device of the user.

In some embodiments, a processor-implemented method includes training a decision tree based on input data and a partitioning objective, to produce a trained decision tree that includes a plurality of nodes. Each node from the plurality of nodes includes at least a subset of the input data from a plurality of subsets of the input data. A modified decision tree is generated by recursively passing the input data through the trained decision tree, and recursively calculating, for each node from the plurality of nodes, an associated set of metrics from a plurality of metrics. An association is recursively defined between each node from the plurality of nodes and the associated set of metrics from the plurality of metrics, thereby generating the modified decision tree. The method also includes identifying a node from the plurality of nodes of the modified decision tree that violates a user-specified threshold value for at least one metric from the plurality of metrics. The user-specified threshold value is associated with a user. The method also includes causing transmission of a signal including a representation of the identified node from the plurality of nodes of the modified decision tree to a compute device of the user.

Figure 5:
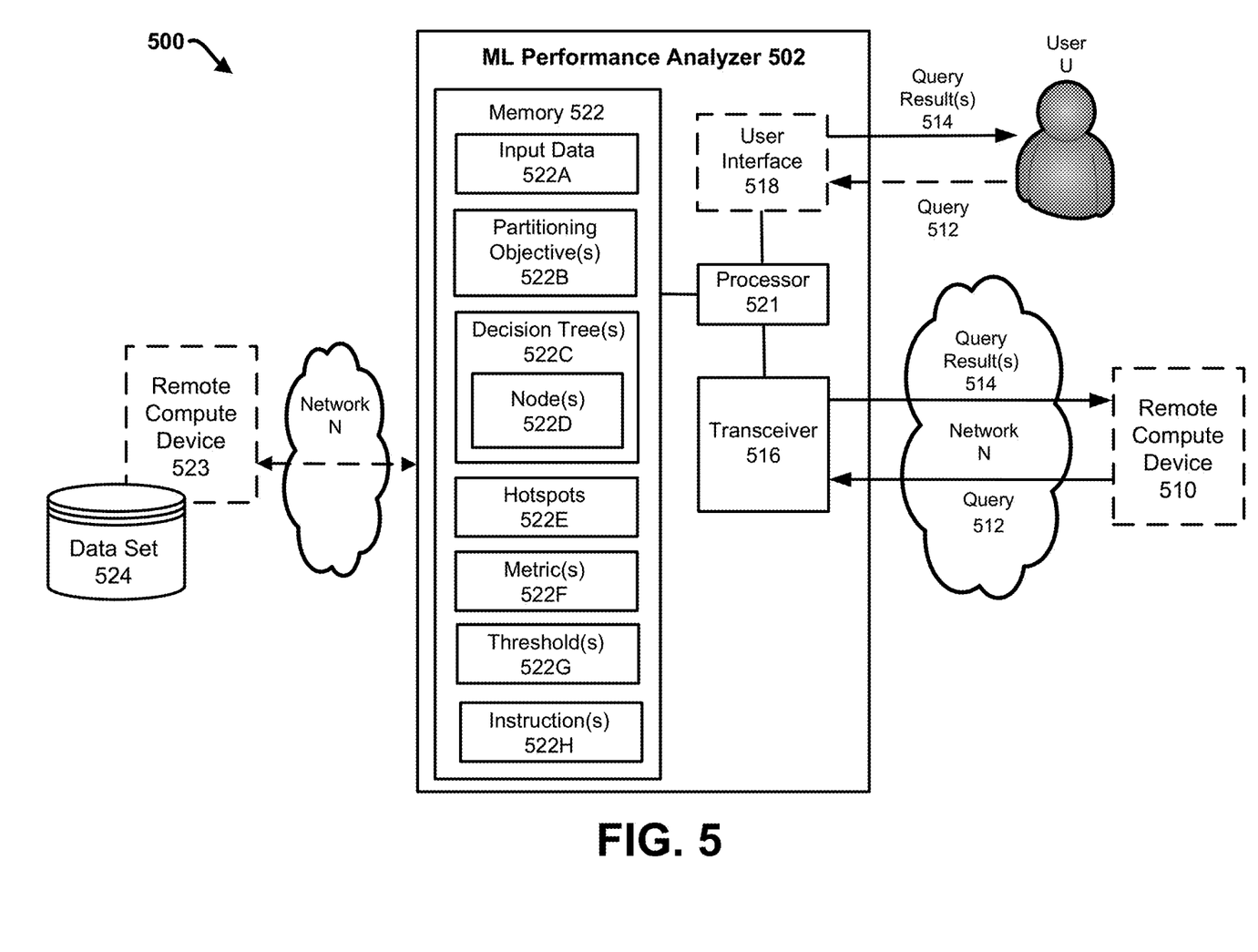
FIG. 5 is a diagram showing a system for detecting regions of underperformance of a machine learning system, according to an embodiment.

FIG. 5 is a diagram showing a system for detecting regions of underperformance of a machine learning system, according to an embodiment. As shown in FIG. 5, the system 500 includes a ML performance analyzer 502 that includes a processor 521 operably coupled to a memory 522, a transceiver 516, and an optional user interface 518 (e.g., a GUI). The ML performance analyzer 502 is optionally in communication via a network "N" (which may be a wired and/or wireless communications network) with a remote compute device 510, e.g., for purposes of querying, and/or via the network N with a remote compute device 523 that is operably coupled to a data set 524, e.g., for purposes of data retrieval. The memory 522 stores processor-executable instructions 522H, e.g., to perform the method 400 of FIG.

4, as well as input data 522A, partitioning objective(s) 522B, decision tree(s) (including unmodified and modified decision trees) 522C with associated nodes 522D, hotspots 522E, metric(s) 522F, and threshold(s) 522G. The input data 522A may be received at the ML performance analyzer 502, via the transceiver 516 and from the remote compute device 523, the remote compute device 510, and/or from user U via the user interface 518. Similarly, any of the input data 522A, partitioning objective(s) 522B, metric(s) 522F, and threshold(s) 522G may be received at the ML performance analyzer 502 via the transceiver 516 and from the remote compute device 523, the remote compute device 510, and/or from user U via the user interface 518. In addition, data stored in the memory 522 can be queried by the user U via the user interface 518 (i.e., the user can submit a query 512 via the user interface 518 and, in response to the query, receive one or more query results 514 (e.g., displayed via, or otherwise output by, the user interface). Alternatively or in addition, a query 512 can be received at the ML performance analyzer 502, via the network N and from the remote compute device 510, and in response to the query, the remote compute device 510 can receive one or more query results 514 from the ML performance analyzer 502 via the network N.

As used herein, the term "accuracy" is defined as follows: of the datapoints in a node, the proportion of those datapoints that have been correctly classified.

As used herein, the term "precision" is defined as follows: of the datapoints in a node with respect to a prediction class, the proportion of those datapoints that were correctly predicted as positive. For example, in a global case with 3 or more labels, the precision may be the average or weighted average of the individual precisions with respect to each prediction class.

As used herein, the term "recall" is defined as follows: of the datapoints in a node with respect to a ground truth class, the proportion of those datapoints that were correctly predicted as positive. For example, in a global case with 3 or more labels, the recall may be the average or weighted average of the individual recalls with respect to each ground truth class.

As used herein, the term "F-Measure" is defined as follows: The mathematical harmonic mean of precision and recall with possible different weightings of the two terms. For example, in a global case with 3 or more labels, the F-Measure may be the average or weighted average of the individual F-measures with respect to each class.

Precision and recall can exist in the binary case (modeling 1s and 0s) and in the multiclass case (modeling 3+ labels), and as such may or may not be defined with respect to a <prediction or ground truth> class. In other words, these terms can be used for both macrometrics (with respect to all datapoints in a node) and for micrometrics (with respect to datapoints in a particular ground truth class).

To illustrate the foregoing metrics in more mathematical terms in the local case, as an example, let "TP," "FP," "TN", and "FN" correspond respectively to true positives, false positives, true negatives, and false negatives. Then, define:

$$\text{Accuracy} = (TP+TN)/(TP+TN+FP+FN)$$

$$\text{Precision} = TP/(TP+FP)$$

$$\text{Recall} = TP/(TP+FN)$$

$$F\text{-Measure} = (1+b^2)*(\text{Precision}*\text{Recall})/(b^2*\text{Precision}+\text{Recall})$$

Figure 6:
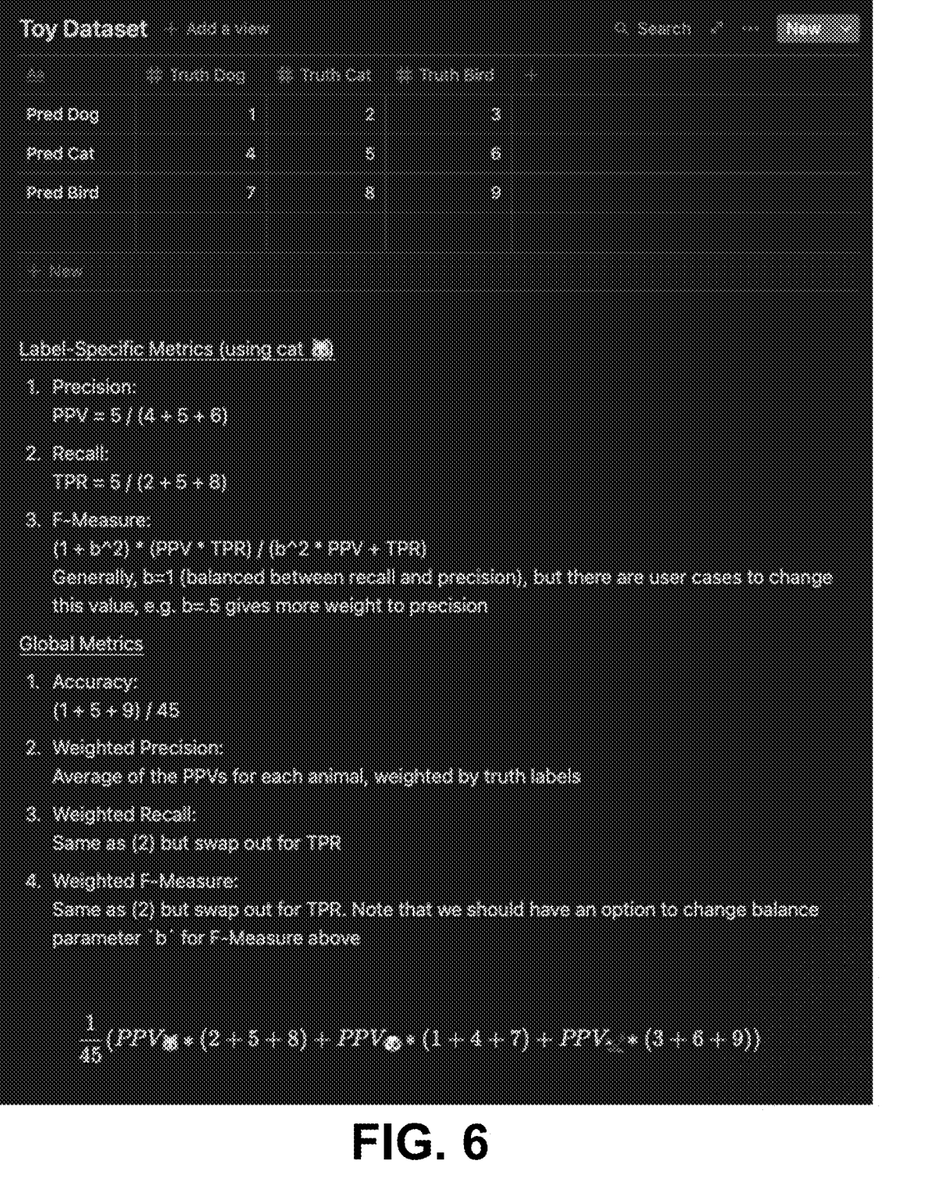
FIG. 6 is an example "toy" dataset with associated metric calculations.

To clarify further, a model might predict a positive. That positive prediction could be correct if the ground truth label is positive (TP) or incorrect if the ground truth label is negative (FP). Similarly, a model might predict a negative. That negative prediction could be correct if the ground truth label is negative (TN) or incorrect if the ground truth label is positive (FN). An example "toy" dataset with associated metric calculations is provided in FIG. 6.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A method, comprising:
   generating, via a processor, a trained decision tree based on input data and a partitioning objective, the trained decision tree including a plurality of nodes, each node from the plurality of nodes having at least a subset of the input data from a plurality of subsets of the input data;
   generating, via the processor, a modified decision tree by:
   (a) recursively passing the input data through the trained decision tree to define a recursion,
   (b) filtering the input data at each split from a plurality of splits of the recursion,
   (c) recursively calculating, for each node from the plurality of nodes, an associated set of metrics from a plurality of metrics, and
   (d) recursively defining an association between each node from the plurality of nodes and the associated set of metrics from the plurality of metrics, thereby generating the modified decision tree, at least two of (a), (c), or (d) at least partially overlapping in time, each node from a plurality of nodes of the modified decision tree including a node threshold and metadata that are concurrently stored at each node from the plurality of nodes of the modified decision tree as the trained decision tree is traversed;
   identifying, via the processor, a node from the plurality of nodes of the modified decision tree that violates a user-specified threshold value for at least one metric from the plurality of metrics, the user-specified threshold value associated with a user; and
   causing transmission of a signal including a representation of the identified node from the plurality of nodes of the modified decision tree from the processor to a compute device of the user.

2. The method of claim 1, wherein the signal further includes a representation of the set of metrics from the plurality of metrics associated with the identified node from the plurality of nodes of the modified decision tree.

3. The method of claim 1, further comprising not further attempting to identify violations of the user-specified threshold value in downstream nodes from the plurality of nodes of the modified decision tree, in response to identifying the node that violates the user-specified threshold value.

4. The method of claim 1, wherein each set of metrics from the plurality of metrics includes a representation of at least one of: an impurity, a number of samples, an entropy, split information, a feature rule set of an associated node path, an accuracy, a precision, a recall, or an F1 score.

5. The method of claim 1, wherein the input data is streaming data and the generating the trained decision tree is performed over a predefined time period.

6. The method of claim 1, wherein the input data is streaming data associated with a predefined time period.

7. The method of claim 1, wherein the input data includes a plurality of classification predictions, and the generating the trained decision tree includes labelling each subset of the input data from the plurality of subsets of the input data based on an accuracy of a subset of classification predictions, from the plurality of classification predictions, associated with that subset of the input data.

8. The method of claim 1, wherein the input data includes a plurality of regression outputs, and the generating the trained decision tree includes labelling each subset of the input data from the plurality of subsets of the input data based on a prediction error of a subset of regression outputs, from the plurality of regression outputs, associated with that subset of the input data.

9. The method of claim 1, wherein the input data includes the metadata and the partitioning objective is defined, at least in part, by the metadata.

10. The method of claim 1, wherein the generating the trained decision tree is further based on an information criterion.

11. The method of claim 10, wherein the information criterion is a Gini impurity.

12. The method of claim 1, wherein the recursively passing the input data through the trained decision tree is performed for each ground truth from a plurality of ground truths.

13. The method of claim 1, wherein the input data includes tabular data.

14. The method of claim 1, wherein the input data includes low-dimensional representations of images.

15. The method of claim 14, wherein the low-dimensional representations of the images are generated using at least one of a convolutional neural network or transfer learning.

16. The method of claim 1, wherein the input data includes low-dimensional representations of text for natural language processing.

17. The method of claim 16, wherein the low-dimensional representations of the text are generated using at least one of a language model or transfer learning.

18. The method of claim 1, wherein each node from the plurality of nodes of the modified decision tree represents a collection of datapoints that are filtered by accumulated ranges of features of the input data along a path from a root node to that node.

19. The method of claim 1, wherein the identified node is an intermediate node of the modified decision tree.

20. The method of claim 1, wherein the identified node is positioned between a root node of the modified decision tree and a terminal leaf node of the modified decision tree.

21. A method, comprising:
generating, via a processor, a modified decision tree by:
(a) recursively passing, via the processor, input data through a trained decision tree to define a recursion,
(b) filtering the input data at each split from a plurality of splits of the recursion, recursively calculating, via the processor and for each node from a plurality of nodes of the trained decision tree, an associated set of metrics from a plurality of metrics, and
(d) recursively defining, via the processor, an association between each node from the plurality of nodes and the associated set of metrics from the plurality of metrics, thereby generating the modified decision tree, at least two of (a), (c) or (d) at least partially overlapping in time, each node from a plurality of nodes of the modified decision tree including a node threshold and metadata that are concurrently stored at each node from the plurality of nodes of the modified decision tree as the trained decision tree is traversed;
identifying, via the processor, a node from the plurality of nodes of the modified decision tree that violates a user-specified threshold value for at least one metric from the plurality of metrics, the user-specified threshold value associated with a user; and
causing transmission of a signal including a representation of the identified node from the plurality of nodes of the modified decision tree from the processor to a compute device of the user.

22. A method, comprising:
training, via a processor, a decision tree based on input data and a partitioning objective, to produce a trained decision tree that includes a plurality of nodes, each node from the plurality of nodes including a portion of the input data;
generating, via the processor, a modified decision tree by:
(a) recursively passing, via the processor, the input data through the trained decision tree to define a recursion,
(b) filtering the input data at each split from a plurality of splits of the recursion,
(c) recursively calculating, via the processor and for each node from the plurality of nodes, an associated set of metrics from a plurality of metrics, and
(d) recursively defining, via the processor, an association between each node from the plurality of nodes and the associated set of metrics from the plurality of metrics, thereby generating the modified decision tree, at least two of (a), (c) or (d) at least partially overlapping in time, each node from a plurality of nodes of the modified decision tree including a node threshold and metadata that are concurrently stored at each node from the plurality of nodes of the modified decision tree as the trained decision tree is traversed;
identifying, via the processor, a node from the plurality of nodes of the modified decision tree that violates a user-specified threshold value for at least one metric from the plurality of metrics, the user-specified threshold value associated with a user; and
causing transmission of a signal including a representation of the identified node from the plurality of nodes of the modified decision tree from the processor to a compute device of the user.

23. The method of claim 22, wherein the input data includes data generated using transfer learning.

* * * * *

UNITED STATES PATENT AND TRADEMARK OFFICE
CERTIFICATE OF CORRECTION

PATENT NO. : 11,915,109 B2
APPLICATION NO. : 17/945335
DATED : February 27, 2024
INVENTOR(S) : Kenneth S. Chen et al.

It is certified that error appears in the above-identified patent and that said Letters Patent is hereby corrected as shown below:

In the Claims

Column 13, Line 9 (Claim 21): "of splits of the recursion, recursively calculating, via" should instead read -- of splits of the recursion, (c) recursively calculating, via --

Signed and Sealed this
Twenty-third Day of April, 2024

Katherine Kelly Vidal
*Director of the United States Patent and Trademark Office*